United States Patent
Kummernuss

(10) Patent No.: US 8,731,456 B2
(45) Date of Patent: May 20, 2014

(54) SYSTEM AND METHOD FOR REQUESTING AND RENDERING AUDIO CONTENTS

(75) Inventor: Thomas Kummernuss, Niederscherli (CH)

(73) Assignee: Swisscom AG, Bern (CH)

( * ) Notice: Subject to any disclaimer, the term of this patent is extended or adjusted under 35 U.S.C. 154(b) by 1763 days.

(21) Appl. No.: 12/125,583

(22) Filed: May 22, 2008

(65) Prior Publication Data

US 2008/0293356 A1    Nov. 27, 2008

(30) Foreign Application Priority Data

May 22, 2007   (EP) .................................. 07405147

(51) Int. Cl.
*H04H 20/71* (2008.01)
*H04H 40/00* (2008.01)
*H04H 20/74* (2008.01)

(52) U.S. Cl.
USPC ...... 455/3.01; 455/3.06; 455/3.04; 455/456.1

(58) Field of Classification Search
USPC ................................................ 455/3.04, 3.01
See application file for complete search history.

(56) References Cited

U.S. PATENT DOCUMENTS

| | | | |
|---|---|---|---|
| 6,965,770 B2 * | 11/2005 | Walsh et al. ................ | 455/426.1 |
| 7,127,261 B2 * | 10/2006 | Van Erlach ................ | 455/456.5 |
| 7,575,518 B2 * | 8/2009 | Tabata ............................ | 463/40 |
| 2003/0037157 A1 | 2/2003 | Pestoni et al. | |
| 2003/0163486 A1 * | 8/2003 | Van Der Meulen ........ | 707/104.1 |
| 2005/0044254 A1 | 2/2005 | Smith | |
| 2009/0081964 A1 * | 3/2009 | Buznach ...................... | 455/90.1 |

FOREIGN PATENT DOCUMENTS

| | | | |
|---|---|---|---|
| DE | 103 06 049 A1 | 9/2004 | |
| WO | WO 03/052610 A1 | 6/2003 | |

* cited by examiner

*Primary Examiner* — Tilahun B Gesesse
(74) *Attorney, Agent, or Firm* — McAndrews, Held & Malloy, Ltd.

(57) ABSTRACT

Order requests for playing audio contents and/or video contents are transmitted by way of communication transmission apparatus (3) via a telecommunication network (2) to a computer-based central unit (1). The central unit (1) determines one of several geographically distributed play units (5, 6, 7) which are remote from the central unit (1) and are separate from the communication transmission apparatus (3), on account of details which are transmitted with the order requests, e.g. an identification or a location detail of a play unit (5, 6, 7), or a location detail of a mobile communication transmission unit (3), for playing the audio contents and/or video contents. The audio contents and/or video contents are transmitted from the central unit (1) as a continuous data flow to the selected play unit (5, 6, 7), and are played there via loudspeakers (51, 61, 71) or displays (52, 72). Several play units may be activated by users via their communication transmission apparatus (3) via a common central unit (1), without different address information and/or contact information of the play units (5, 6, 7) having to be used. Moreover, the play units (5, 6, 7) do not have to be provided with a receiver module (11) for the receiving and the processing of order requests for audio contents.

19 Claims, 2 Drawing Sheets

SYSTEM AND METHOD FOR REQUESTING AND RENDERING AUDIO CONTENTS

TECHNICAL FIELD

The present invention relates to a system and to a method for requesting and playing multi-media contents. The present invention in particular relates to a system and to a method for requesting digital audio contents by way of communications transmission apparatus via a telecommunication network, and for playing the audio contents by way of play units, which are separate from the communication transmission apparatus.

STATE OF THE ART

The request and downloading of audio contents by way of communication transmission apparatus via telecommunication networks has become increasingly simpler and more popular, in particular with the spread of broadband and more rapid connections to the internet, as well as the more efficient compression of audio files, e.g. by way of MP3 (moving picture expert group—audio player 3). The audio files are downloaded by way of communication transmission apparatus, which are installed in a fixed manner or are mobile, e.g. personal computers or mobile radio telephones, and are often stored in mobile play apparatus, e.g. MP3 play apparatus, for playing later. Due at least partly to the lightweight and mobile availability, traditional apparatus for requesting and playing audio contents in public places, e.g. juke boxes in restaurants and bars, are becoming something of the past. Typically, mobile play apparatus however have no acoustic playing quality which may be compared to that of a traditional juke box.

A virtual jukebox is described in the patent application US 2003/0163486, which receives music wishes from portable control apparatus, for example via a communication network.

A computer-aided jukebox system is described in the patent application US 2003/0037157, which permits music wishes to be received via a communication network, e.g. a LAN (local area network), VPN (virtual private network) or the internet, from different request apparatus such as PC, notebook, or PDAs (personal digital assistant). The jukebox system may be connected to various loudspeaker systems, which for example are distributed in a building.

A jukebox system is described in the patent application US 2005/0044254, in which users transmit their music requests per mobile telephone via mobile radio network to the jukebox, e.g. per SMS (short messaging services). Requested music files may be downloaded by the jukebox by a central system. The position of a user is determined by way of a position evaluation system, e.g. GPS (global positioning system), and bars with available jukeboxes are displayed to the user. The audio files are for example arranged distanced to the play unit of the jukebox.

With these known jukebox systems, the order request of a user for an audio file is always transmitted to the jukebox system, which also carries out a playing of the audio content. This however requires the user in each case to have address information and/or contact information available, in order to request the play of an audio content at a local or remote jukebox system. Moreover, the local jukebox systems must in each case be provided with receiver modules and control modules, in order to receive such order requests from the requesting communication transmission apparatus and to process them, i.e. to identify, relate and play the audio content concerned.

DESCRIPTION OF THE INVENTION

It is the object of the present invention, to suggest a system and a method for requesting and playing multi-media contents, which do not have the disadvantages of the state of the art. It is in particular an object of the present invention, to suggest a system and a method for requesting and playing audio contents, with which local jukebox devices which are provided for playing audio contents, do not need to be configured to for the receipt and the processing of order requests for audio contents. In particular, a further object of the present invention is to suggest a system and a method for requesting and playing audio contents, with which order requests for audio contents may be transmitted by way of communication transmission apparatus, for example without in each case address information and/or contact information having to be known by the individual local jukebox devices.

According to the invention, these objects are in particular achieved by the elements of the independent claims. Further advantageous embodiments are further to be deduced from the dependent claims and the description.

The objects mentioned above, are achieved by the present invention, in particular in that the order requests for multimedia contents, in particular for audio contents, are transmitted by way of communication transmission apparatus via a telecommunication network, to a computer-based central unit, and that the multimedia contents, in particular audio contents, are transmitted from the computer-based central unit via a telecommunication network in each case according to an order request, to one or more geographically distributed play units which are remote from a central unit and are separate from the communication transmission apparatus, for playing the multi-media contents, in particular the audio contents. Apart from the audio contents, the multi-media contents, depending on the design, comprise further coded digital contents which may be played by play units for the stimulation of human sense organs, for example video information, picture information, etc. The order request for multi-media contents/ audio contents is thus transmitted by the users by way of the communication transmission apparatus, e.g. mobile communication transmission apparatus, via a telecommunication network, e.g. a mobile radio network, to a receiver module which is arranged in the central unit arranged remotely from the play units. Preferably, the central unit transmits the requested multi-media contents/audio contents as a continuous data flow, to the play unit concerned. Different address information and/or contact information of play units does not need to be known, by way of the fact that several play units may be activated by users by way of the communication transmission apparatus via a common central unit. Moreover, the play units may be designed more simply compared to the state of the art, since they do not need to comprise a receiver module for the receipt and the processing of order requests for audio contents, and moreover since they do not need to be provided with a memory module for the local storage of audio data with audio contents.

Preferably, in each case a detail for determining one of the play units is transmitted with the order requests to the central unit. The central unit determines a selected play unit on account of this detail, and the central unit provides the respective multi-media contents/audio contents for transmission to the selected play unit. The transmission is effected in the push or pull mode from the central unit to the play unit. In the pull mode, the play unit for example sets up a communication channel e.g. a streaming channel, via which the prepared multi-media contents are transmitted from the central unit to the play unit. In the push mode, the provided multimedia contents are transmitted on the initiative of the central unit to the envisaged play unit. The detail for determining the play unit comprises an identification of the play unit and/or a location detail. The identification of the play unit for example comprises a name or an identification number of the play unit. The location detail for example comprises a location detail which indicates where the play unit is localised, e.g. a name of a locality such as a bar, restaurant or club, or a location detail which indicates where the requesting communication transmission apparatus is positioned, e.g. GPS coordinates or identifications for a network cell or base station. Thus different possibilities for the selection of the play unit to be activated are supported by the transmission of details for determining the play unit. The play unit may be selected automatically on account of the current geographic position of the user or his communication transmission apparatus, for example according to the position of the user with the input and transmission of the order request, or according to the current position of the user with the planned play of the requested audio content, in the case that the user in the meantime has moved into a different location with a play unit. The play unit may however also be selected on account of an identification which is inputted, read in or spoken by the user, so that a desired audio content is played in a locality independently of whether the user is located in the locality or not.

In one embodiment variant, the central unit introduces a received order request for an audio content into a queue, and determines a planned time for the playing of the audio content concerned. The planned time is transmitted from the central unit to the requesting communication transmission apparatus for the information of the user concerned. This embodiment variant is advantageous above all if several requests for the play of different audio contents pile up and must be sequentially processed.

In a further embodiment, at least certain of the audio contents are combined with video contents, and the central unit transmits the combined audio contents/video contents to the play unit concerned, for audible and visible playing. The combined audio contents/video contents are transmitted from the central unit to the play unit concerned, preferably as a continuous data flow.

Apart from the system and the method for requesting and playing multimedia contents/audio contents, the present invention also relates to a computer program product with computer program code means for the control of one or more processors of a computer-based central unit, in a manner such that the central unit receives order requests for multimedia contents/audio contents from communication transmission apparatus via a telecommunication network, and the multimedia contents/audio contents via a telecommunication network in each case according to an order request, are transmitted to one of several geographically distributed play units which are remote from the central unit and separate from the communication transmission apparatus, for playing the multimedia contents/audio contents. Preferably, the computer program product comprises a computer-readable medium, on which the computer program code means are stored.

BRIEF DESCRIPTION OF THE DRAWINGS

One embodiment of the present invention is hereinafter described by way of one example. The example of the embodiment is illustrated by the following attached figures.

WAYS OF CARRYING OUT THE INVENTION

Figure 1:
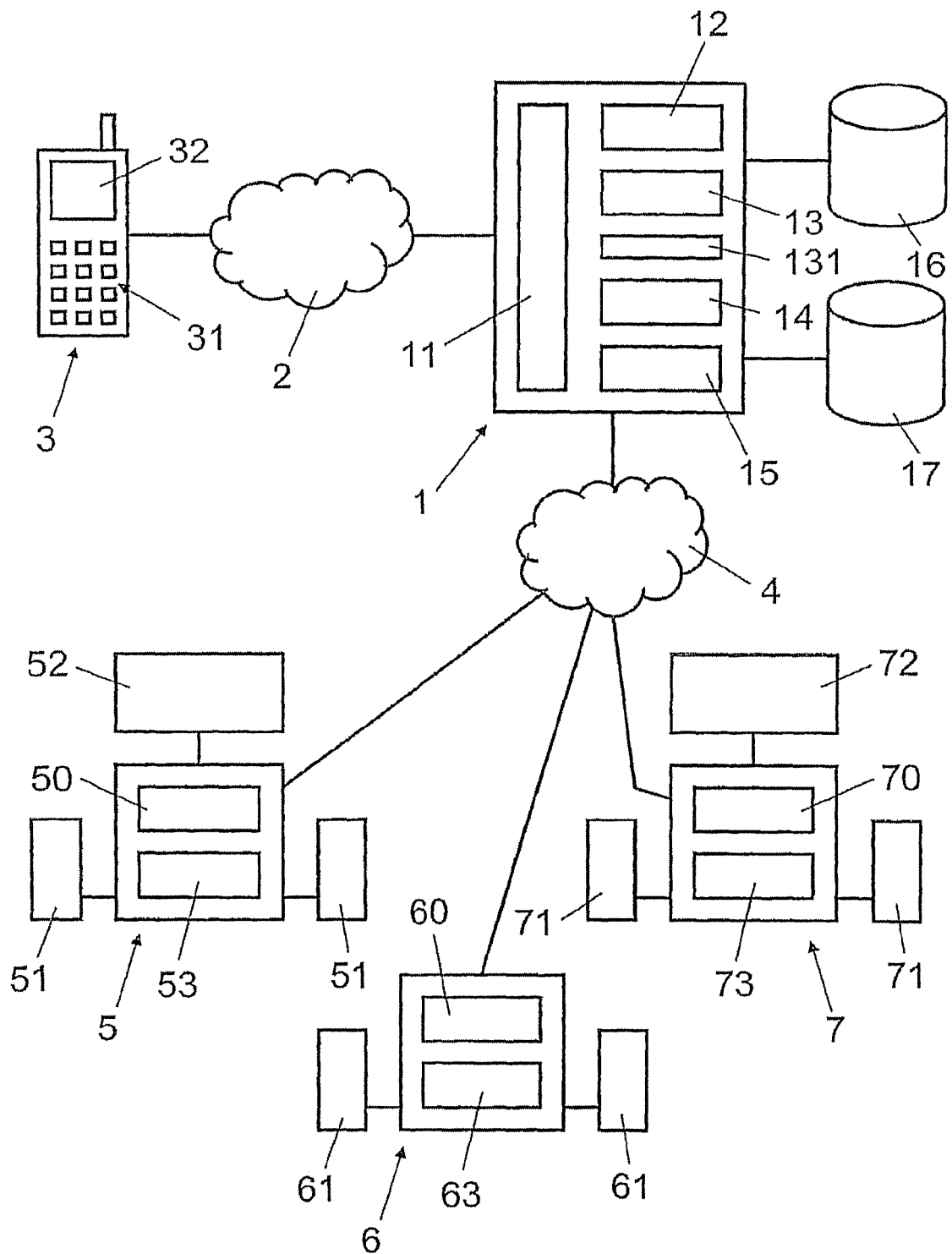
FIG. 1 shows a block diagram, which schematically illustrates a computer-based central unit which may be connected to communication transmission apparatus for receiving order requests for audio contents, and which may be connected to geographically distributed play units which are remote from the central unit, for playing the audio contents.

In FIG. 1, the reference numeral 1 indicates a computer-based central unit for receiving order requests for playing multimedia contents, in particular audio contents and/or video contents, and for distributing the requested audio contents and/or video contents to geographically distributed play units 5, 6, 7 which are remote from the central unit 1. The central unit 1 comprises one or more computers, in each case with one or more processors. The central unit 1 is configured to communicate with external communication transmission apparatus 3 via the telecommunication network 2, and to communicate with the external play units 5, 6, 7 via the telecommunication network 4. The central unit 1 moreover comprises different functional modules, specifically a receiver module 11, a selection module 12, a time planner module 12 with a queue 131, a content server 14, as well as streaming server 15. The functional modules are preferably designed as programmed software modules. The computer program code of the software module is part of a computer program product, and is preferably stored in a computer of the central unit 1, on a computer-readable data carrier, which is connected to the computer in a fixed or removable manner. The functions of the functional modules are later described in more detail with reference to FIG. 2. The central unit 1 also has data banks at its disposal, which are designed together with the function modules on a computer, or are designed on a separate computer for example connected via a network connection (e.g. internet). The data banks comprise an audio data bank/video data bank 16, with audio files and/or video files which define audio contents and/or video contents, as well as a content data bank 17 which comprises further data contents, e.g. advertising information in the form of text data, picture data, audio data and/or video data.

The telecommunication network 2 preferably has a wireless mobile radio network, e.g. a GSM-network (global system for mobile communication), a UMTS-network (universal mobile telephone system) or another, for example satellite-based mobile radio network, or a WLAN (wireless local area network). Depending on the embodiment variant, the telecommunication network 2 also comprises a fixed network, i.e. the publicly circuited telephone network, an ISDN network (integrated services digital network), a LAN (local area network) or preferably the internet (IP-based network) or an intranet. The telecommunication network 4 preferably comprises a fixed network, for example designed as described in combination with the telecommunication network 2. The telecommunication networks 2 and 4 may also overlap or be identical.

The communication transmission apparatus 3 is representative for a multitude of communication transmission apparatus, which are configured to communicate with a central unit 1 via the telecommunication network 2. The communication transmission apparatus 3 is preferably a mobile, portable communication transmission apparatus, e.g. a mobile radio telephone, a PDA computer (personal digital assistant), a notebook computer, a laptop computer or a computer play device, e.g. a playstation. In an alternative embodiment, the communication transmission apparatus 3 is a communication transmission apparatus which is installed in a fixed manner, for example a PC. The communication transmission apparatus 3 comprises input elements 31 and a display 32 for the interaction with the user.

The play units 5, 6, 7 are preferably computer-based and comprise a streaming client 50 as well as a video driver and/or media player 53, 63, 73, which are preferably designed as programmed software modules. The play units 5, 6, 7 may also be designed as IP radios or as a media bridge. The play units 5, 6, 7 are configured to in order to communicate with the central unit 1 via the telecommunication network 4. The play units 5, 6, 7 moreover in each case comprise at least one power amplifier for amplifying the electrical audio signal defined by the audio data, for playing the audio contents, and electro-acoustic transducers 51, 61, 71 (loudspeakers) for the audible paying of audio contents based on the amplified audio signal. The power amplifier and electro-acoustic transducers for example correspond to a commercially common stereo installation for professional application. In one embodiment variant, at least certain play units 5, 7 furthermore comprise a display 52, 72 controlled by a video driver 53, 73, for the visible playing of video contents which are defined by video data. The displays 52, 72 are for example LCD (liquid crystal display) or plasma displays. The play units 5, 6, 7 for example comprise a PC on which the streaming client 50 and the video driver or media player 53, 63, 73 are designed, wherein the PC is connected to the display 52, 72 as well as to the acoustic transducers 51, 61, 71 via the power amplifier. The play units 5, 6, 7 are typically arranged in different geographically distributed localities. The play units may in particular be implemented by way of commercially available devices.

One possible procedural sequence and data exchange with the request and the playing of audio contents is described in the following paragraphs with reference to FIG. 2.

Figure 2:
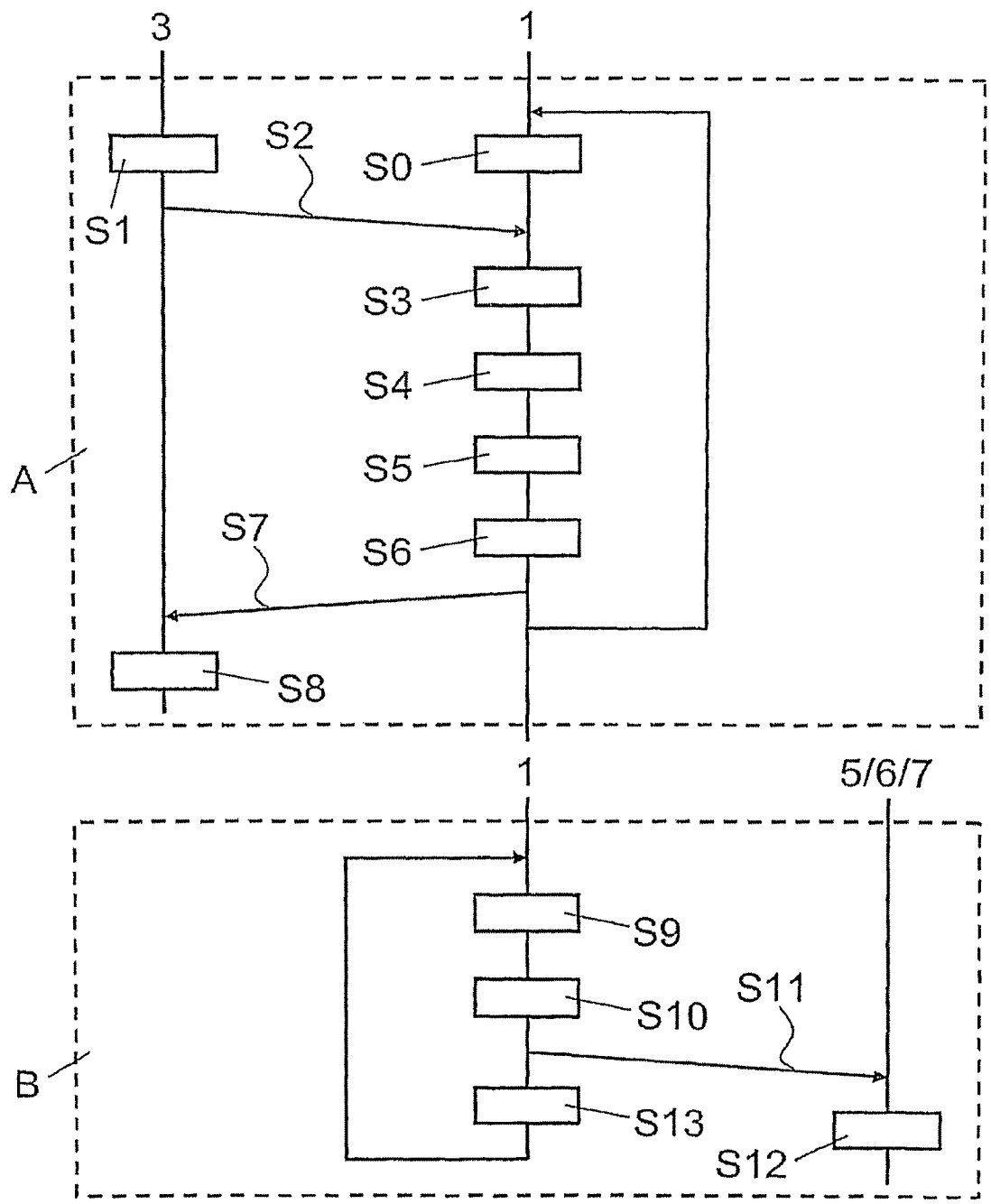
FIG. 2 shows a flow diagram which represents one example of a simplified method sequence and data exchange on requesting and playing audio contents.

As is represented schematically in FIG. 2, the method may be divided into two separate blocks A and B which take place parallel to one another. Block A comprises a possible step sequence, or the order request of an audio content from the central unit 1 by way of a communication transmission apparatus 3. Block B comprises a possible step sequence for the transmission and playing of the requested video contents.

In step S1, an order request (demand) for the playing of a certain audio content and/or video content is prepared. For the user-controlled determining of the play unit 5 6, 7 to be used, the user has the possibility of defining one or more play unit(s) 5, 6, 7 by a name or an identification, wherein the name or the identification determines the locality in which the play unit 5, 6, 7 is arranged, or he directly and explicitly determines the play unit 5, 6, 7. The name or the identification is for example displayed in the locality. Typically, the audio content and/or video content is played via a play unit 5, 6, 7, but however it is also possible to specify several play units 5, 6, 7 for the play. The selection of the content to be played and/or the play unit(s) 5, 6, 7 to be used, is effected for example by way of the selection from a list whilst using the display 32 and input elements 31, by way of inputting a name or an identification per input element 31, or via a speech recognition module or via speech controlled menu guidance (interactive voice response, IVR). Lists of audio contents and/or video contents with names or identifications with respect to this are for example printed in the locality (e.g. on a paper serviette, a table, a wall or a poster), specified on a display or may be loaded as files into the communication transmission apparatus 3, e.g. from the central unit 1 or via an apparatus interface (e.g. Bluetooth) from the play unit. For the user-specific selection of the play unit(s) 5, 6, 7, in the communication transmission apparatus 3, one may also apply graphic user interfaces with location-dependent representation of digital geographic cards, on which selectable play units 5, 6, 7 are displayed. Finally, in one embodiment variant, the current geographical position of the user or of the communications transmission apparatus 3 is automatically determined by way of a position determining module, for example by way of a GPS-receiver, or on the basis of network parameters such as cell identification or base station identification. In one variant, the user may apply an option, which displays to the central unit that the position of the user or of the communication transmission apparatus 3 is only to be effected at the moment briefly before the planned playing of the contents, so that the playing is effected via another play unit 5, 6, 7 when the user moves into the locality with this other play unit 5, 6, 7. The user also has the possibility, together with the order request, to transmit additional accompanying data, e.g. text data, picture data, audio data and/or video data, to the central unit 1.

In step S2, the transmission of the order request from the communication transmission apparatus 3 via the telecommunication network 2 to the central unit 1 is effected. The certain location details are transmitted as part of the order request, or together with the order request in separate protocol data units. The transmission of the order request is effected for example by way of SMS (short messaging services), MMS (multimedia services), IP requests (internet protocol) e.g. via a WAP portal (wireless application platform), IVR (interactive voice response) or other suitable data telegrams or data transmission services. The receiver module 11 receives the transmitted order request, the details for determining the play unit(s) as well as the possible accompanying data.

In step S3, the selection module 12 selects the play unit(s) 5, 6, 7 to be used, on the basis of the details which are received with the order request, for determining the play unit. If a user-defined determining has been carried out, one or more of the play units 5, 6, 7, are selected on account of the specified name or identifications. Preferably, the play units 5, 6, 7 are however selected on the basis or location details which have been received with the order request. The location details are either specified by the user or are automatically determined by the communication transmission apparatus 3, as has been described above.

In step S4, the content server 14 obtains the audio files and/or video files from the audio/video data bank 16, said files corresponding to the audio contents and/or video contents specified in the order request.

In step S5, the content serve 14 prepares the data flow for the transmission to the selected play unit(s) 5, 6, 7. The data flow, apart from the audio files and/or video files for the requested audio contents and/or video contents, also includes possible accompanying data transmitted by the user, e.g. for greetings messages in text form, picture form, audio form and/or video form, as well as possible further contents from the contents data bank 17, e.g. advertising messages in text form, picture form, audio form and/or video form.

In step S6, the time planner module 13 adds the order request or a suitable assigned data element into the queue 131. Moreover, the time planner module 13 determines a planned playing time for the playing of the audio content and/or video content concerned via the play unit(s) concerned, on account of the position of the introduced order request in the queue 131, as well as the data lengths or play times of the contents (data flows) which are to be played beforehand. Depending on the embodiment variant, order requests for all play units 5, 6, 7 controlled by the central unit 1 are added to the queue 131, or a separate queue 131 is assigned to each of the play units 5, 6, 7, in the central unit 121.

The planned play time is transmitted from the time planner module 13 in step S7 via the telecommunication network 2 to the communication transmission apparatus 3 of respective user, where it is represented on the display 32 in step S8.

At this location, it should be noted that the time planner module 13 may also plan the playing of audio contents, which are requested by the operator of the play unit(s) 5, 6, 7 concerned (and/or by an advertising sponsor), for example according to a list for background music (and/or advertising blocks). Order requests for audio contents are for example planned in the queue 131, such that user wishes have the greatest priority, and the operator wishes are only taken into account when there are no user wishes, or that user wishes and operator wishes are played with fixed shares and/or sequences, wherein existing operator wishes are always played when there are no user wishes.

In step S0, the receiver module 11 waits for further order requests, which are transmitted by the communication transition apparatus 3 via the telecommunication network 2.

In step S9, the time planner module 13 in the queue 131 determines the entry and the assigned data flow which is to be played next.

In step S10, the streaming server 15 begins the continuous transmission of the data flow determined in step S9. Depending on the embodiment variant, the streaming mode is set up once between the receiver module 11 and the streaming server 15 for the transmission of several (e.g. consecutive) audio contents, e.g. daily or with the request of the first audio content, etc.

In step S11, the streaming server 15 transmits the determined data flow continuously to the play unit(s) concerned 5, 6, 7, where the data flow is continuously received by the streaming client 50, 60, 70.

In step S12, the streaming client 50, 60, 70 continuously plays the received data flow by way of the video driver or media player 53, 63, 73 in an audible manner via the electroacoustic transducers 51, 61, 71 and/or in a visible manner via the displays 52, 62, 72. Greetings messages contained in the accompanying data, in text form, picture form, audio form or video form are selectively played before, during or after the audio contents and/or video contents.

In step S13, the time planner module 13 in the queue 131 checks as to whether further order requests for playing audio contents and/or video contents, are to be processed, and, as the case may be, continues with determining the next content to be played, in step S9. Otherwise, the time planner module 13 waits until in step S6, new order requests for playing audio contents and/or video contents are added to the queue 131. Together with the playing of the requested contents, short identification of a few characters may also be displayed, e.g. a simple URL (uniform resource locator) or order code, by way of which the played audio content and/or video content may be automatically obtained or ordered by the users who are present, e.g. as download on his communications transmission apparatus 3, e.g. a mobile radio telephone and/or MP3-player, or as a memory medium (CD, DVD) by post.

The order request and the playing of the audio data and/or video data may be set up in a cost-free manner, preferably sponsored by added advertising contents, or be charged to the user concerned as telecommunication costs.

The man skilled in the art understands that the sequence of the steps described above is only an example, and other sequences of the steps for requesting and playing audio contents and/or video contents may also be applied. For example, the creation of a time plan and the evaluation of the planned playing time in step S6 may also be carried out before the preparation of the data flow.

In further embodiment variants, moreover audio files and/or video files or a link (URL) relating to this, are loaded via the telecommunication network 2 onto the communication transmission apparatus 3 to the user from the central unit 1 according to the order request, or the ordering of a data carrier (CD, DVD, etc) with the files stored thereon is selectively initiated. For example, an ordered and/or paid for audio file and/or video file is transmitted to a suitable (music and/or video) server of the user.

What is claimed is:

1. A system for requesting and playing video contents, comprising:
    a receiver module for receiving order requests for audio contents, said order requests being transmitted by way of communication transmission apparatus via a telecommunication network, and
    a computer-based central unit remote from the play units, for transmitting audio contents via a telecommunication network to several geographically distributed play units separate from the communication transmission apparatus,
    wherein:
        the receiver module is arranged in the computer-based central unit,
        the computer-based central unit is configured to transmit the audio contents in each case according to an order request, to one of the play units for playing the audio contents, and the one of the play units is activated via the communication transmission apparatus and
        wherein transmission of the audio contents from the computer-based central unit to the play units is performed based on a push mode and/or a pull mode.

2. A system according to claim 1, wherein the receiver module is configured, with the order requests, to receive in each case one detail for determining one of the play units, and the computer-based central unit is configured to determine a selected play unit on the basis of this detail, and to provide the respective audio contents for transmission to the selected play unit.

3. A system according to claim 2, wherein the detail for determining one of the play units includes at least one of a location detail where the play unit is localised, a location detail where the requesting communication transmission apparatus is positioned, and the identification of the play unit.

4. A system according to claim 1, wherein the computer-based central unit comprises a time planner module which is configured to introduce a received order request for an audio content into a queue, to determine a planned time for the playing of the respective audio content, and to transmit the planned time, to the requesting communication transmission apparatus for the information of a user.

5. A system according to claim 1, wherein the computer-based central unit comprises a streaming server which is configured to transmit requested audio contents to the play unit, in each case as a continuous data flow.

6. A system according to claim 1, wherein at least certain of the audio contents are combined with video contents, and the computer-based central unit is configured to transmit the combined audio/video contents to the playing units for the audible and visible playing.

7. A system according to claim 1, wherein the receiver module is configured to receive the order requests for audio contents via a mobile radio network from the mobile communication transmission apparatus.

8. A system according to claim 1, further comprising a multitude of order cards, which include details and assigned identifications of orderable audio contents.

9. A method for requesting and playing audio contents, comprising:
   transmission of order requests for audio contents by way of communication transmission apparatus via a telecommunication network, to a computer-based central unit, and
   transmission of the audio contents from the computer-based central unit via a telecommunication network in each case according to an order request, to one of several geographically distributed play units which are remote from the computer-based central unit and are separate from the communication transmission apparatus, for playing audio contents, and the one of the several geographically distributed play units is activated via the communication transmission apparatus and wherein the transmission of the audio contents from the computer-based central unit to the play units is performed based on a push mode and/or a pull mode.

10. A method according to claim 9, wherein with the order requests, in each case a detail for determining one of the play units is transmitted to the computer-based central unit, the central unit on account of this detail determines a selected play unit, and the computer-based central unit provides the respective audio content for transfer to the selected play unit.

11. A method according to claim 10, wherein the detail for determining one of the play units includes at least one of a location detail where the play unit is localised, a location detail where the requesting communication transmission apparatus is positioned, and an identification of the play unit.

12. A method according to claim 9, wherein the computer-based central unit introduces a received order request for an audio content into a queue, determines a planned time for the playing of the audio content concerned, and transmits the planned time to the requesting communication transmission apparatus, for the information of the user.

13. A method according to claim 9, wherein the computer-based central unit transmits requested audio contents in each case as a continuous data flow, to the play unit.

14. A method according to claim 9, wherein at least certain of the audio contents are combined with video contents, and the computer-based central unit transmits the combined audio/video contents to the play units for the audible and visible playing.

15. A method according to claim 9, wherein the order requests for audio contents are transmitted from mobile communication transmission apparatus via a mobile radio network to the central unit.

16. A non-transitory computer-readable medium with computer program code stored thereon, the computer program code being executable by one or more processors of a computer-based central unit, such that the computer-based central unit:
   receives order requests for audio contents from communication transmission apparatus via a telecommunication network, and
   transmits the audio contents via a telecommunication network in each case according to an order request, to one of several geographically distributed play units which are remote from the central unit and are separate from the communication transmission apparatus, for playing the audio contents, and the one of the several geographically distributed play units is activated via the communication transmission apparatus and wherein the transmission of the audio contents from the computer-based central unit to the play units is performed based on a push mode and/or a pull mode.

17. The non-transitory computer-readable medium according to claim 16, wherein the computer program code is executed by the processors of the central unit in a manner such that the computer-based central unit with the order requests, in each case receives a detail for determining one of the play units, determines a selected play unit on the basis of this detail, and provides the respective audio content for transmission to the selected play unit, wherein the detail for determining one of the play units comprise at least one of a location detail where the play unit is localised, a location detail where the requesting communication transmission apparatus is positioned, and an identification of the play unit.

18. The non-transitory computer-readable medium according to claim 16, wherein the computer program code is executed by the processors of the central unit in a manner such that the computer-based central unit introduces a received order request for an audio content into a queue, determines a planned time for the playing of the respective audio content, and transmits the planned time to the requesting communication transmission apparatus, for the information of a user.

19. The non-transitory computer-readable medium according to claim 16, wherein the computer program code is executed by the processors of the central unit in a manner such that the computer-based central unit transmits the requested audio contents in each case as a continuous data flow to the play unit.

* * * * *